(12) United States Patent
Karmous (10) Patent No.: US 12,280,854 B2
(45) Date of Patent: Apr. 22, 2025

(54) SYSTEM AND METHOD FOR REDUCING DRAG ON THE HULL OF A VESSEL

(71) Applicant: Khaled M. Karmous, Houston, TX (US)

(72) Inventor: Khaled M. Karmous, Houston, TX (US)

( * ) Notice: Subject to any disclaimer, the term of this patent is extended or adjusted under 35 U.S.C. 154(b) by 0 days.

(21) Appl. No.: 18/792,787

(22) Filed: Aug. 2, 2024

(65) Prior Publication Data
US 2025/0050975 A1    Feb. 13, 2025

Related U.S. Application Data

(60) Provisional application No. 63/531,439, filed on Aug. 8, 2023.

(51) Int. Cl.
B63B 1/38      (2006.01)

(52) U.S. Cl.
CPC .......... B63B 1/38 (2013.01); *B63B 2001/387* (2013.01)

(58) Field of Classification Search
CPC ............................ B63B 1/38; B63B 2001/387
See application file for complete search history.

(56) References Cited

U.S. PATENT DOCUMENTS 9,663,212 B2    5/2017   Sancoff

FOREIGN PATENT DOCUMENTS

| CA | 1304992 C | * 7/1992 | ............. B63B 35/08 |
|---|---|---|---|
| CN | 219277718 U | 6/2023 | |
| GB | 1385247 A | 2/1975 | |
| JP | H06298159 A | 10/1994 | |
| JP | 6253021 B2 | 12/2017 | |
| JP | 2023067297 A | 5/2023 | |
| JP | 2023067298 A | 5/2023 | |
| KR | 101487416 B1 | 1/2015 | |
| SE | 8701466 A | * 10/1988 | ............. B63B 35/08 |
| TW | 201726489 A | 8/2017 | |
| TW | 201829249 A | 8/2018 | |

(Continued)

OTHER PUBLICATIONS

Written Opinion of the International Searching Authority, PCT US/24/43238 dtd Nov. 12, 2024 (Year: 2024).*

(Continued)

*Primary Examiner* — Anthony D Wiest
(74) *Attorney, Agent, or Firm* — Egbert, McDaniel & Swartz, PLLC (57) ABSTRACT

Disclosed is a method of reducing drag on the hull of the vessel by creating a Coanda flow on the hull by jetting a fluid onto the hull or surface continuous with hull at a location above the waterline in the vessel. The Coanda flow extends below the waterline, entraining air below the waterline and adjacent to the hull. The Coanda flows generated by the free jets impacting targets embedded in wear plates can be created in any direction relative to the vessel forward direction. An air cavity is also created by the jetted fluid. A system for reducing drag is also disclosed, wherein the system includes a pump in fluid communication with a source of fluid, power source connected to the pump and at least one nozzle positioned above the waterline of the vessel and oriented towards the hull of the vessel so as to jet the fluid thereon.

15 Claims, 9 Drawing Sheets
(6 of 9 Drawing Sheet(s) Filed in Color)

(56) References Cited

FOREIGN PATENT DOCUMENTS

WO     1989/010294 A1    11/1989
WO     2023191096 A1    10/2023

OTHER PUBLICATIONS

International Search Report for corresponding PCT/US2024/043238 dated Nov. 12, 2024.
Written Opinion of the International Searching Authority for corresponding PCT/US2024/043238 dated Nov. 12, 2024.

* cited by examiner

SYSTEM AND METHOD FOR REDUCING DRAG ON THE HULL OF A VESSEL

CROSS-REFERENCE TO RELATED APPLICATIONS

The present application claims priority to U.S. Provisional Application No. 63/531,439, filed on Aug. 8, 2023, presently pending.

BACKGROUND OF THE INVENTION

The present invention relates to systems and methods for the reduction of drag on the hull of a vessel. More particularly, the present invention relates to the reduction of drag by forcing a liquid Coanda flow on the hull of the vessel. Additionally, the present invention relates to creation of an air cavity between the forced Coanda flow and the water in which the hull is traveling through.

Maritime regulations continuously aim to push toward enhancing the efficiency and performance of ships. A critical aspect of this effort is the reduction of ship resistance, which directly influences fuel consumption and environmental impact.

A ship's resistance relates to the drag on the hull from the water through which the ship travels. In other words, the resistance or drag is a result of friction between the hull surface and the surrounding water.

The vast majority of expenses for shipping goods relate to the cost of fuel required to power the ships or vessels. Further, the environmental impacts from shipping are extremely significant. As such, the maritime industry has made many attempts to reduce ship resistance and drag. Traditional methods of reducing ship resistance focus on optimizing the hull design and utilizing advanced materials. However, optimized hull design and material considerations that can only go so far in reducing ship resistance.

Various patents and patent publications relate to reducing resistance on ships. For example, Japanese Publication JP 2023067298A relates to reducing resistance caused by waves at the bow of the ship. In this publication, water is suctioned through an inflow opening part and a suction opening part, and then exits the vessel through a plurality of spray ports, which may be provided at the bottom of the vessel. The water is sprayed away from the submerged hull so as to prevent the water from flowing along the hull surface.

U.S. Pat. No. 9,663,212 discloses a high-speed surface craft and a submersible vehicle. In particular, the patent discloses a watercraft having a plurality of nozzles disposed an outer surface of the hull, wherein the nozzles are configured to release a friction-reducing fluid which may displace water from the surface of the hull so as to diminish friction on the outer surface of the hull.

Taiwanese Publication TW201726489 a discloses a bow drainage system for a ship. In particular, the publication discloses a number of water jets which are arranged so as to so remove seawater resistance at the front of the vessel.

International Patent Publication WO2023191096A1 discloses another hull friction reducing apparatus. In particular, the hull friction reducing apparatus aims to create a bubble stream near the bottom of the vessel by blowing air outwardly from a plurality of air outlet holes provided on the vessel bottom.

Japanese publication JPH06298159A teaches a spray device which aims to reduce wave resistance at the front of a vessel.

Japanese Publication JP6253021B2 describes a waterjet propulsion system to assist the propellers of a vessel. Taiwanese Publication TW201829249 describes another type of vessel which utilizes waterjet propulsion.

The Coanda Effect

The Coanda effect is a natural phenomenon whereby a fluid jet, when directed at a convex surface, stays attached to the convex surface, creating what we will refer to as a Coanda flow. The jetted fluid may follow a flat or curved surface and also may entrain fluid from the surroundings. A region of lower pressure may develop adjacent to or in the area of the Coanda flow.

While the phenomenon was observed at least as early as the early 1800s, it was later named after Romanian inventor Henri Coanda, as he was the first to recognize the practical application of the phenomenon, in particular related to aircraft design. In addition to aviation, the Coanda affect has applications in many industries.

One way to observe the Coanda effect is to apply a jet of water (such as from a garden hose nozzle) to a flat surface. It can be observed that this jet of water may create a Coanda flow (resembling a flat sheet) which spreads and moves along the flat surface. In order create such a Coanda flow, it is necessary that the jet be provided at a speed greater than zero, noting that the higher the speed the more effective the Coanda flow will be.

Several patents and patent publications have discussed Coanda flow as it relates to maritime vessels. For example, Japanese Publication JP2023067297A discusses a thrust generation system for a vessel. This publication relates to propulsion of the ship by suctioning water from below the waterline and spraying outwardly, above or below the waterline in a direction away from the vessel. While the publication contemplates the creation of the Coanda effect on the bottom of the vessel, the publication teaches away from creation of the Coanda effect along the hull. Japanese publication JP2023067298A, discussed above, similarly teaches away from creation of a Coanda flow along the hall the vessel.

Korean Publication KR101487416B1 discloses a system of using fluid spray at the stern of the vessel. In particular, fluid is sprayed below the waterline from a plurality of water nozzles along the hull. The plurality of nozzles are positioned below the waterline, and this publication describes a lift effect due to the Coanda effect, and additionally, an increase in thrust of an adjacent propeller. Importantly, the fluid spray nozzles of this publication are positioned below the waterline near the bottom of the hull.

It is an object of the present invention to provide a system and method for reducing drag on the hull of a vessel.

It is an object of the present invention to provide a system and method for reducing drag on the hull of vessels of various sizes.

It is another object of the present invention to provide a system and method which greatly reduces fuel and the associated costs of shipping and propulsion of vessels.

It is another object of the present invention to provide a system and method which enables significant reduction of emissions associated with the propulsion of vessels.

It is another object of the present invention to create a Coanda flow along the hull of the vessel so as to decrease frictional resistance between the hull and surrounding water.

It is yet another object of the present invention to provide a system and method which creates an air cavity between the hull of the vessel and surrounding seawater so as to greatly reduce drag on the vessel.

It is yet another object of the present invention to provide a system and method which changes the flow characteristics around the hull of the vessel.

These and other objects and advantages of the present invention will become apparent from a reading of the attached specification and appended claims.

SUMMARY OF THE INVENTION

The present invention is a method of reducing drag on the hull of a vessel by creating Coanda flows on the hull of the vessel by jetting a fluid onto the hull or a surface continuous with the hull at a location above the waterline of the vessel. The Coanda flow extends below the waterline of the vessel. In an embodiment, the fluid is water.

The method may further include providing at least one jet nozzle positioned above the waterline of the vessel. The at least one jet nozzle is adapted to jet the fluid. The jet nozzle may contact the hull or surface continuous with the hull at an angle between 0.001° and 90°. Preferably, the angle may be approximately 2.5°.

In an embodiment, air is entrained as the Coanda flow extends below the waterline of the vessel, so as to create an air cavity between the hull or Coanda flow and surrounding water in which the vessel is moving.

In an embodiment, the surface continuous with the hull is a wear plate. The wear plate may have a target thereon.

In an embodiment, the at least one jet nozzle includes two or more nozzles arranged in spaced relation along the vessel such that respective Coanda flows of the two or more nozzles merge.

The present invention is also a method of creating an air cavity between the hull of the vessel and surrounding water in which the vessel is traveling. In the method, a fluid is jetted against the hull or surface continuous with the hull such that the jetted fluid forms a Coanda flow which extends from a point above the waterline of the vessel to a point below the waterline of the vessel. In an embodiment, the fluid is water.

In an embodiment, the method further includes providing at least one jet nozzle positioned above the waterline of the vessel. The at least one jet nozzle is adapted to jet the fluid. The at least one jet nozzle may include two or more nozzles arranged in spaced relation along the vessel such that respective Coanda flows of the two or more nozzles merge. Merging of the Coanda flows may or may not be required.

The present invention is also system for reducing drag on the hull of the vessel. The system includes a pump in fluid communication with the source of fluid. A power source is connected to the pump. At least one nozzle is provided in fluid communication with the pump. The at least one nozzle is positioned above the waterline of the vessel. The at least one nozzle is oriented towards a hull of the vessel.

In an embodiment, the system includes a wear plate affixed to or formed with the hull of the vessel. The at least one nozzle is directed towards the wear plate. The wear plate is positioned above the waterline of the vessel, and may run from above the waterline to below the waterline. The wear plate may have a target thereon.

In an embodiment, the at least one nozzle includes at least one nozzle positioned on the starboard side of the vessel and at least one nozzle positioned on the port side of the vessel. Two or more nozzles may be positioned on each of the port and starboard sides of the vessel.

In an embodiment, the at least one nozzle includes a first grouping of nozzles and a second grouping of nozzles positioned apart from the first grouping of nozzles on the same side of the vessel.

In an embodiment, the at least one nozzle includes at least one nozzle positioned at or near a bow or stern of the vessel.

In an embodiment, the at least one nozzle is adapted to jet a liquid so as to contact a hull of the vessel or surface continuous with the hull of the vessel at an angle of incidence between 1 and 30° relative to the target on the wear plate.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The system and method of the present invention operate by directing high-pressure jets at targets placed on the hull of a vessel. This creates liquid Coanda flows such that the skin friction along the hull will be reduced compared to normal vessel skin friction at the same speed and displacement.

The total reduced friction on a vessel hull, compared to normal vessel operations, has two components. First, the friction that occurs between the hull and the surrounding stagnate water—at locations where the liquid Coanda effect flows are moving at high speed (an order of magnitude above vessel speed)—is greatly reduced due to reduced friction of liquid-on-liquid versus liquid-on-solid (hull). This is a portion of the total reduced friction. Second, a lack of friction (or zero friction) occurs when an air cavity caused by the liquid Coanda flows adheres to the hull. The air cavity is produced by a multitude of fluid dynamic forces. The area covered by the air cavity theoretically represents the majority (approx. 95%) of the reduced friction.

Figure 1:
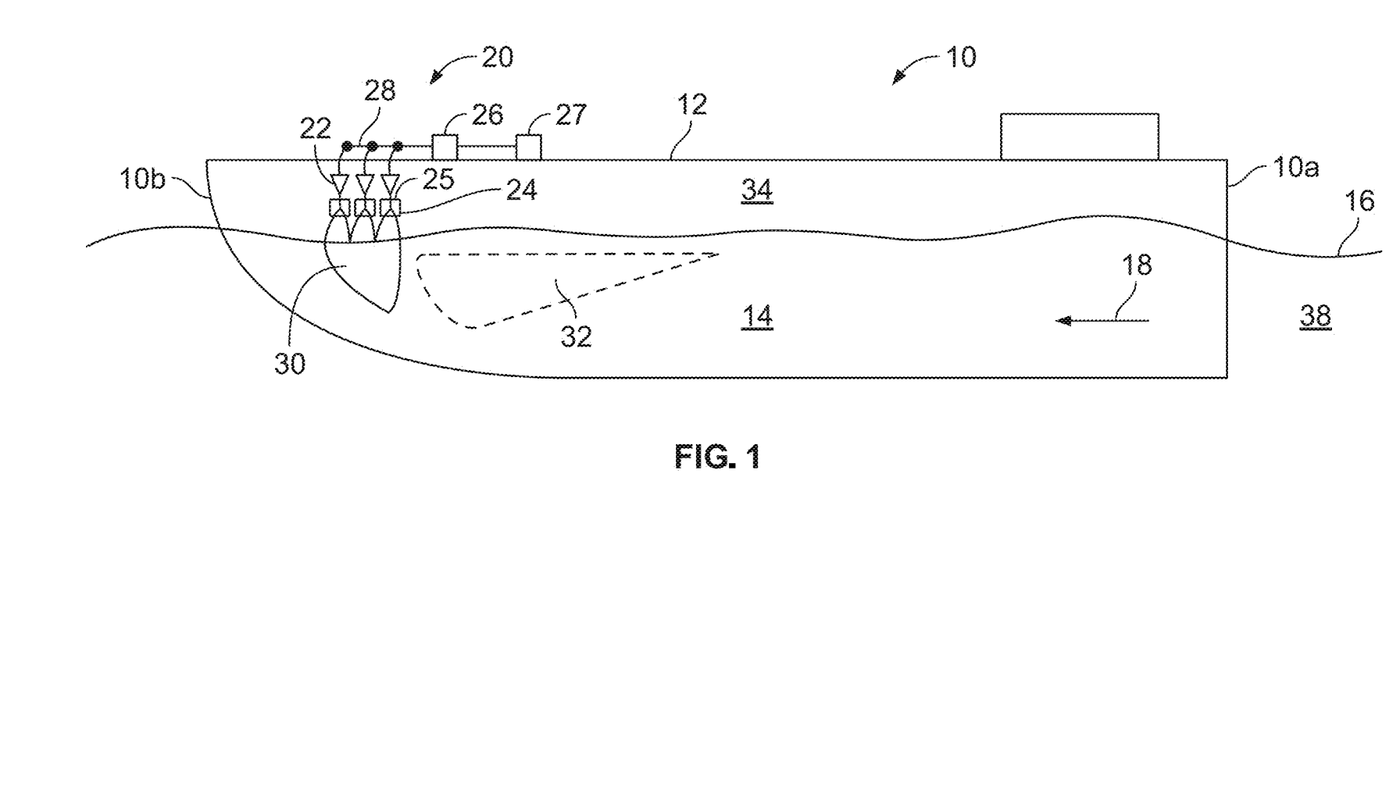
FIG. 1 is a simplified view illustrating the system and method of the present invention.

Referring to FIG. 1, there is shown the system and method of the present invention. Please note that FIG. 1 is not drawn to scale. FIG. 1 illustrates a vessel 10. The vessel 10 has a stern 10a and bow 10b. The vessel 10 has a deck 12 and a hull 14. In FIG. 1, the port side of the vessel 10 is shown. It is understood that the starboard side may have a similar or identical arrangement of components in the system of the present invention. The vessel 10 shown in FIG. 1 is a tanker or cargo ship. However, the present invention may be applied to vessels of any size, provided that the hull surface is Coanda-friendly in the direction of the forced Coanda flows.

FIG. 1 illustrates how the vessel 10 is situated in seawater 38 (or freshwater, as may be the case), wherein a waterline 16 is shown along the hull 14 of the vessel. The direction of travel of the vessel 10 is illustrated by the arrow 18.

In the system and method of the present invention, there are a plurality of jet nozzles 22 mounted along the hull 14 of the vessel 10. In FIG. 1, the plurality of jet nozzles 22 are situated below the deck 12, but above the waterline 16, and along the surface of the hull 14. It is also within the concept of the present invention that the plurality of jet nozzles 22 may be situated on or above the deck 12 of the vessel 10.

FIG. 1 illustrates how the plurality of jet nozzles 22 are connected via a plurality of conduits 28 to a high-pressure pump or pumps. 26. The pump or pumps 26 may vary depending on the needs and size of the vessel. The pumps 26 are illustrated as being connected to a power source 27. A manifold may be provided between the pumps 26 and the plurality of jet nozzles 22. The jet nozzles 22 may be provided in a number of sizes, depending on the size of vessel and flow rate and pressure required. For practical purposes, jet nozzle sizes of between 0.001 mm (i.e. the minimum allowed by the physical properties of the fluid) and 25 mm may be utilized. It is understood that the pumps, conduits and power supply may be provided in a variety of configurations.

The plurality of jet nozzles 22 are directed in a generally downward direction towards the hull 14 of the vessel. A plurality of wear plates are provided below the plurality of jet nozzles 22 in the path of fluid jetted from the plurality of jet nozzles 22. In FIG. 1, a plurality of targets 24 positioned on the plurality of wear plates are shown. The jetted fluid may be provided between 0 and 3,300 mph (speed of sound in saltwater). For modeling purposes, initial jet velocities of approximately 750 mph were used. Similarly, the pressure may also vary widely, but 8000 psi was used for modeling purposes.

As shown in FIG. 1, the jetted fluid from the plurality of jet nozzles adheres to the surface of the hull 14 and forms a Coanda flow 30 on the hull 14 of the vessel 10.

FIG. 1 illustrates, in an approximation, the shape of the resultant Coanda flow 30. As can be seen in FIG. 1, and as will be explained in greater detail hereinafter, the respective Coanda flows from the plurality of jet nozzles 22 merge so as to form the Coanda flow 30 illustrated below the waterline 16. The Coanda flow 30 is a thin sheet of high-velocity liquid which adheres to the hull 14.

As will be explained in greater detail hereinafter, it was observed in computational fluid dynamics (CFD) simulations/modeling that introduction of the Coanda flow 30 causes an air cavity 32 to be formed or created in close proximity of the Coanda flow 30 along the hull 14 of the vessel 10. The air cavity 32 may also be described as an air pocket, air bubble or air sheet. The shape of the observed air cavity 32 in FIG. 1 is approximate, and will be explained in greater detail herein below. The air cavity 32 adheres to the hull 14 of the vessel 10 due to conditions of vacuum and develops as it contacts the vessel, which is moving in a forward direction. It is understood that the air cavity 32 is caused by the jetted fluid and resulting Coanda flow 30 entraining air from above the waterline 16, coupled with the vacuum conditions below the free surface of the water.

As can be seen in FIG. 1, the air cavity 32 tapers off eventually. It is within the concept of the present invention that a second set of jet nozzles may be provided at a location 34 where the air cavity 32 has tapered off. By utilizing a second set of nozzles on the same side of the vessel, more of or an entirety of the vessel can be subjected to the Coanda flow 30 and the air cavity 32, thereby further reducing drag on the vessel.

In a preferred embodiment of the present invention, the starboard side of the vessel 10 has an identical arrangement of jet nozzles 22. It is also within the concept of the present invention that the jet nozzles may be placed at different locations along the hull of the vessel. For example, the plurality of jet nozzles 22 may be positioned closer to the bow 10b of the vessel 10, the stern 10a of the vessel 10 or at a combination of locations.

Figure 2:
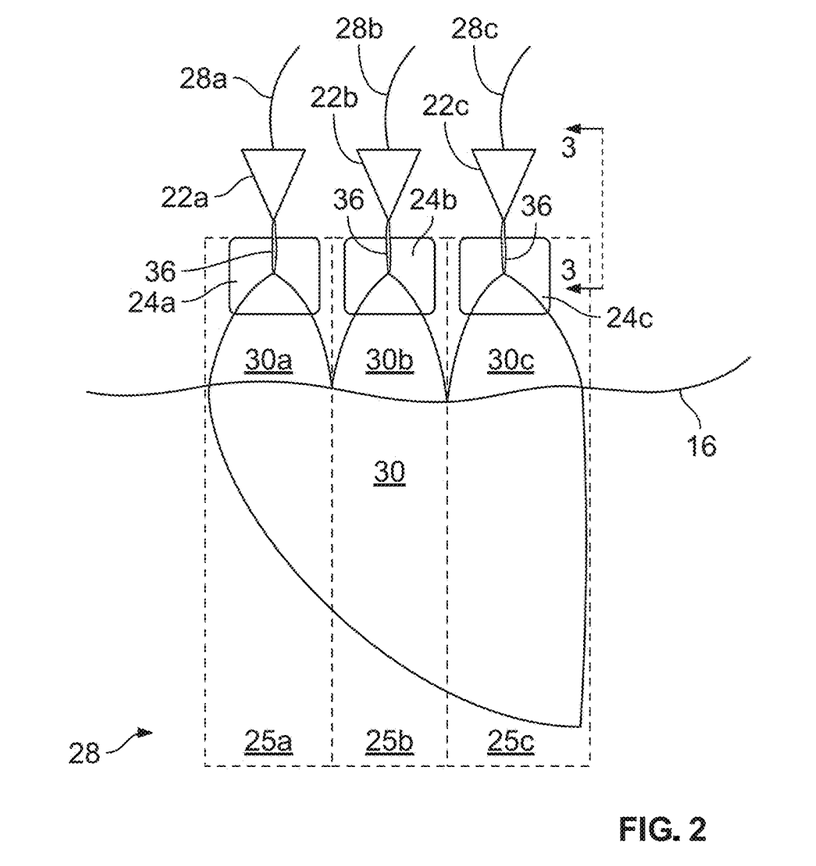
FIG. 2 is a close-up view of an arrangement of jet nozzles in accordance with an embodiment of the system and method of the present invention.

FIG. 2 is a close-up view of the system of the present invention. In FIG. 2, it can be seen how three jet nozzles 22a, 22b and 22c are provided. The jet nozzles are connected by conduits 28a, 28b and 28c to the pump or pumps (not shown in FIG. 2). FIG. 2 further illustrates three targets 24a, 24b and 24c, which are impacted by the jetted fluid 36. The targets 24a, 24b and 24c are situated on the wear plates 25a, 25b and 25c, respectively, of the plurality of wear plates 25. The targets 24a, 24b and 24c are not necessarily shown to scale, and may be considerably smaller relative to the wear plates on which they are positioned.

The plurality of wear plates may be individual plates or a single plate having a suitable width for being impacted by the jetted fluid 36 from each of the three jet nozzles 22a, 22b and 22c. Preferably, the jet nozzles are positioned close to the targets of the wear plates so as to minimize the exposure of the jetted fluid 36 to air, which causes atomization of the jetted fluid 36 and corresponding reduction of energy of the jetted fluid 36 and the resulting Coanda flow. However, the free jet and Coanda flow entrain air over the distance they are moving at high velocity above the free surface of the water so the length of the free jet and Coanda flows above the free surface of the water must be greater than zero to allow for entrainment.

Notably, the plurality of wear plates 25a, 25b and 25c preferably extend from above the waterline 16 and below the waterline along the hull surface. By providing the wear plates 25a, 25b and 25c below the waterline, the hull is protected from wear associated with the Coanda flow 30, while the targets 24a, 24b and 24c, made of a harder material than the wear plates, protect the hull surface in the area where the jetted fluid would contact the hull.

The jet nozzles 22a, 22b and 22c cause Coanda flows 30a, 30b and 30c, respectively. By arranging the plurality of jet nozzles 22 in a particular configuration where the distance between the respective jet nozzles is minimal, the respective Coanda flows 30a, 30b and 30c have been observed to merge so as to form a single Coanda flow 30. The present invention defines a Coanda flow as all velocities greater than 150 mph. Preferably, the distance between the jet nozzles 22a, 22b and 22c is equal to the width of steady state liquid Coanda effect flow, so as to cause and take advantage of the merged Coanda flow 30 without interference. As such, the ideal distance between the jet nozzles would depend on other parameters (jet nozzle size, pressure, etc.).

The merged Coanda flow 30 impacts the waterline 16 along the hull 14 at a slightly reduced velocity compared to the initial velocity of the jetted fluid 36. For example, the velocity of the merged Coanda flow 30 at the waterline 16 may be approximately 550 mph assuming a jetted fluid velocity of 744 mph. FIG. 2 illustrates how the high-velocity Coanda flow 30 generally tapers towards the stern of the vessel. However, the Coanda flow 30 will continue further downwardly along the hull surface, though at a reduced and diminishing velocity.

Figure 3:
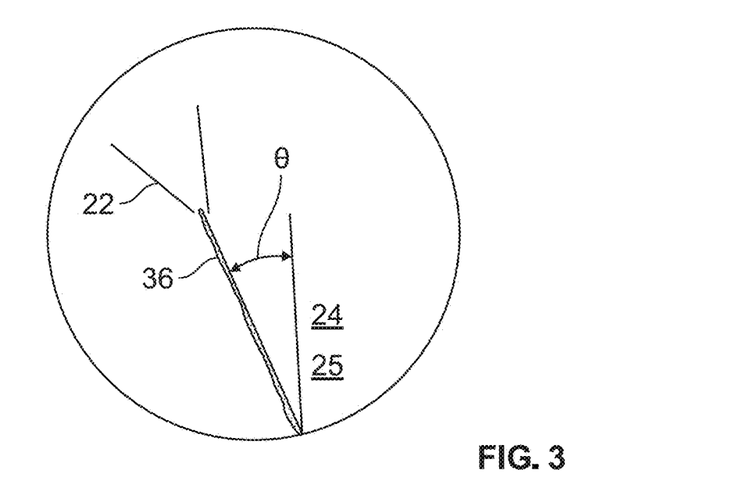
FIG. 3 is a sectional view illustrating the angle of incidence between the jetted liquid and the hull surface or wear plate.

While FIG. 3 shows three jet nozzles 22, this number may vary. In order to create a merged Coanda flow, at least two jet nozzles would be required. Nozzles in excess of three could also be used, but this also increases the required flow rate for the jetted liquid.

FIG. 3 is a cross-sectional view illustrating the angle of incidence between the jetted fluid 36 from the jet nozzle 22 and the target 24 of the wear plate 25. The angle θ between the jetted fluid 36 and the impact wear plate 25 is preferably between 0.001° and 90°. During CFD modeling, it was found that an angle of approximately 2.5° would be suitable for creating the Coanda flows described herein. It is possible to provide the jetted fluid at greater angles. However, Coanda flows become more spread out as the angle of incidence increases.

Figure 4A:
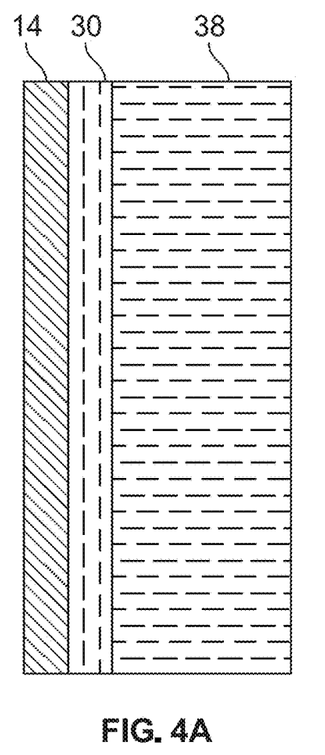
FIG. 4A illustrates the interface between the hull and the surrounding water in an area of the Coanda flow.

FIG. 4A illustrates the interface between the hull surface 14 and the surrounding seawater 38 in the area of the Coanda flow 30. In this area, the Coanda flow 30 covers the surface of the hull 14. It has been observed that the Coanda flow 30 travels with the vessel and with the hull of the vessel. Here, the first component of friction reduction due to the present invention is achieved. Because the Coanda flow is adhered to the hull 14, the friction that occurs between the vessel and the surrounding stagnate water is greatly reduced due to reduced friction of the liquid-on-liquid contact (Coanda flow/seawater) as compared to a typical vessel's solid-on-liquid (hull/seawater) contact.

Figure 4B:
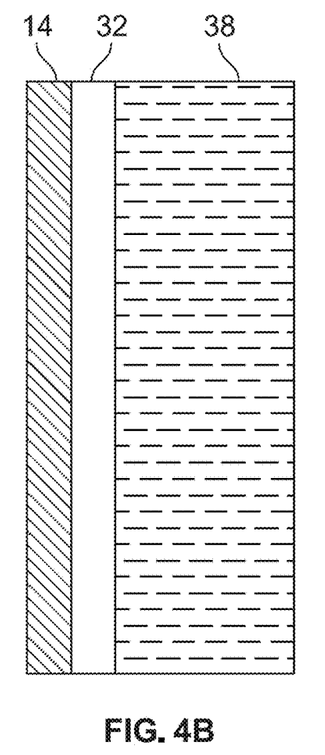
FIG. 4B illustrates the interface between the hull and the surrounding water in an area of the air cavity.

Referring to FIG. 4B, there is shown the interface between the hull surface 14 and the seawater 38 in the area of the air cavity 32. Importantly, the air cavity 32 is sandwiched directly between the hull surface 14 and the surrounding seawater 38, resulting in an area where drag on the vessel is negligible compared to drag caused by water. This is the second component of friction reduction due to the present invention. Because the air cavity 32 is adhered to the hull 14, the friction that occurs between the vessel and the surrounding stagnate water is greatly reduced due to the reduced friction of the air-on-liquid contact (air cavity/seawater) as compared to a typical vessel's solid-on-liquid (hull/seawater) contact. Viscous friction between two fluids (water-on-water for Coanda flow areas; water-on-air for air cavity areas) are known to be much lower than fluid (liquid or gas) on a surface such as a hull.

Figure 5A:
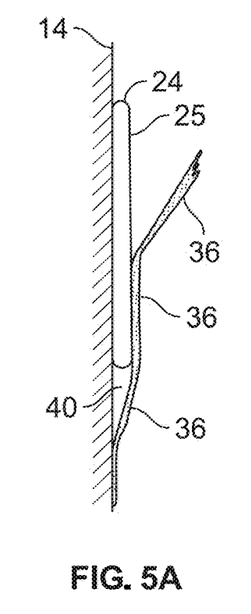
FIG. 5A illustrates a first embodiment of a wear plate in accordance with the system of the present invention.
Figure 5B:
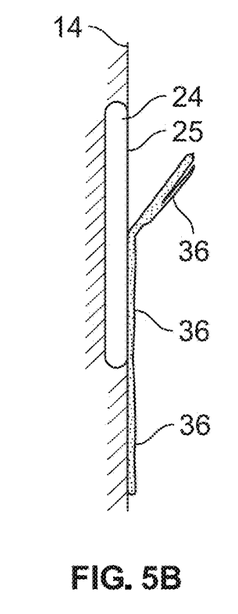
FIG. 5B illustrates a second embodiment of the wear plate in accordance with the system and method of the present invention.

FIGS. 5A and 5B illustrate alternate embodiments of the wear plates 25/targets 24 of the system and method of the present invention. FIG. 5A a illustrates an example where the wear plate 25 is mounted to the surface of the hull 14. In FIG. 5A, the jetted fluid 36 contacts the wear plate 25 and the resulting Coanda flow travels downwardly so as to eventually contact the surface of the hull 14. It is well known and documented that Coanda flows can "step down" when given a small elevation change, as shown at reference numeral 40 in FIG. 5A.

FIG. 5B illustrates another embodiment of the present invention wherein the wear plate 25 is embedded or otherwise formed or affixed in the surface of the hull 14 so as to be flush with the hull surface. In this embodiment, the jetted fluid 36 likewise forms a Coanda flow extending downwardly along the surface of the hull 14. In each of these examples, the impact wear plate is continuous with the surface of the hull. In other configurations, it may be possible to provide wear plates or surfaces which are connected to the vessel but positioned outwardly therefrom, such as at the very front of the vessel.

The wear plates 25 illustrated in FIGS. 5A and 5B are flat. Depending on the size of the vessel and the location of the wear plate on the vessel, the wear plate may be curved so as to match the curvature of the particular vessel. For example, with smaller vessels such as those used for recreational boating, the hull (or vessel side shell) may have a more pronounced curvature. With a very large vessel, even a relatively small wear plate may have a minor curvature if positioned on the bow or stern. However, in either case, the convex nature of the curvature is "Coanda-friendly" and would only enhance performance. It is well known that Coanda flows accelerate when bending around a Coanda friendly surface. It is not fully understood why Coanda flows exhibit this response, which is very much like a space vessel being gravitationally slingshot into outer space by flying close to planets such as Jupiter and Saturn, when launched from Earth.

A Coanda flow may be created on the hull of the vessel without utilizing wear plates. Preferably, however, the wear plates and associated targets are provided so as to reduce wear on the hull of the vessel resulting from directing the jetted fluid to the hull of the vessel. The target where the jet impinges on the wear plate may be made from hard materials able to withstand continuous free jet impingement like diamond or ruby. The plurality of wear plates may be made from titanium, ceramic or other durable material and may be mounted in a variety of ways within the concept of the present invention. In an embodiment of the present invention, the wear plates, targets and jet nozzles can be a single unit which can be easily mounted to the hull of the vessel. Such a configuration would be of particular use for retrofitting vessels with the system of the present invention.

The wear plates 25 importantly start located above the waterline 16 of the vessel 10, and may be located up to or above the main deck level 12. Preferably however, the targets 24 embedded in the wear plates 25 are located as close to the waterline 16 as possible without being subjected to waves. This arrangement minimizes energy loss of the Coanda flow in the air, while allowing for some distance for entrainment of air. Importantly, by providing the targets 24 of the wear plates 25, and the jet nozzles 22 above the waterline 16, the Coanda flow 30 enters the water from the air, resulting in the entrainment of the air so as to form the air cavity.

The system and method of the present invention utilize high-pressure jets directing jets of water or other liquid at high speed onto the hull, creating a dynamic water layer and air cavity that can reduce frictional resistance. This changes the flow characteristics around the hull in a way that consequently minimizes drag. The effectiveness of the system and method relies on various parameters, including the pressure, velocity, nozzle size and quantity of jets, the angle of incidence for the jet impacting the hull or wear plate, the spacing of the jets between each other, the angle of the jets relative to seawater/freshwater free surface, the friction coefficient of the hull surface where the liquid and gas (air cavity) contact the hull, the temperature of fluids, especially gases (air), and the vessel forward velocity.

To test the effectiveness of the system and method, computational fluid dynamics was utilized. Computational fluid dynamics (CFD) simulations are robust and cost-effective means to investigate and optimize techniques such as the present invention. By employing advanced CFD tools, complex fluid interactions involved in this process can be simulated to predict the impact of high-pressure jets on ship resistance. These simulations allowed for detailed analysis of the flow patterns, boundary layer behavior, and drag forces, providing insights that are difficult to achieve through experimental methods alone. The background, selected parameters and results of the CFD simulations are discussed herein below.

Theoretical Background

I. Ship Resistance and Hydrodynamics

Ship resistance includes different components involving frictional resistance, pressure resistance, wave-making resistance, and air resistance. Among these, frictional resistance, which arises from the viscous drag, is particularly significant in the case of displacement ships which is mainly used for maritime transportation. The boundary layer theory provides a fundamental understanding of this phenomenon, describing the thin layer of fluid near the hull where viscous forces are predominant.

II. Frictional Resistance ($R_f$)

Frictional resistance is the dominant component for displacement ships and can be estimated using the ITTC (International Towing Tank Conference) 1957 formula:

$$R_f = 0.5 \rho V^2 \, S \, C_f$$

where:
$\rho$ is the density of water,
V is the velocity of the ship,
S is the wetted surface area of the hull,
$C_f$ is the frictional resistance coefficient.

The frictional resistance coefficient, $C_f$, can be calculated using the ITTC-57 correlation:

$$C_f = \frac{0.075}{(\log(Re) - 2)^2}$$

where Re is the Reynolds number, defined as:

$$Re = \frac{VL}{\nu}$$

with:
L being the characteristic length of the ship (usually the length of the hull),
$\nu$ is the kinematic viscosity of water.

III. Boundary Layer Theory

The Boundary Layer Theory, introduced by Ludwig Prandtl, describes the behavior of fluid flow near a solid boundary. Within this thin layer, the velocity of the fluid changes from zero at the wall (no-slip condition) to the free-stream value away from the wall. The boundary layer can be divided into two main regions: the laminar boundary layer and the turbulent boundary layer. The transition from laminar to turbulent flow significantly affects the frictional resistance.

Methodology

I. CFD Simulation Setup

Flow domain: The initial step in the CFD simulation process involves creating a 3D domain for fluid flow from the jet and the ship hull idealized as a flat plate extending 5 meters below the waterline. High-pressure jet nozzles are located on the hull 1 meter above the waterline. The setup includes three jets positioned along the hull to maximize their impact on the boundary flow. The spacing between the jets is 0.125 m.

Mesh: A high-quality mesh was generated for the fluid domain surrounding the hull plate. The mesh was sized to capture detailed flow characteristics, especially near the hull and jet regions. Finer mesh was employed near the hull surface and around the jet nozzles to capture the complex interactions between the jets and the hull boundary layer.

Boundary Conditions: For the inlet boundary, a velocity magnitude of 740 mph for the jet and a turbulent intensity of 5% were specified. No-slip boundary conditions were applied to the hull surface to simulate the interaction between the hull and the surrounding fluid accurately.

Jet Nozzle Parameters: In addition to those discussed above, the following parameters were defined with respect to the jet nozzles to simulate their effect on the flow over the hull:
  jet nozzle angle of incidence: 2.5 degrees;
  number of Jet Nozzles: 3;
  jet nozzle Location: 1 m above the waterline;
  fluid jet exits nozzle and impacts wear plate (mounted flush or slightly raised above hull) approximately 0.25 m away from (below) jet nozzle;
  wear plates are located approximately 0.75 m above the average water line for the vessel; and
  jet nozzles are connected to a new HP pump via hydraulic hoses with safety clamp tie downs Other settings included:
  solver type: pressure-based, double-precision solver;
  turbulence model: SST k-omega; and
  multiphase model: volume of fluid (VOF) method was used to model the interaction between water and air phases.

II. Simulation Cases

The analysis considered parameters relevant to oil tankers and container ships, which typically operate at speeds ranging from 17 to 26 knots (20 to 30 mph). To investigate the effect of high-pressure jets in the flow field, simulations were conducted at two different ship speeds: 27 mph and 40 mph. The 27 mph speed represents a normal speed within the operational range for tankers and container ships. Simulating at this speed allows for the assessment of the jet effectiveness under typical cruising conditions. The 40 mph ship speed was to confirm the system would operate at higher speeds, and was included to investigate jet performance under higher speed conditions.

The hull surface was modelled as a nonslip wall representing a standard surface condition for most ships. The nonslip condition provides a baseline for understanding the potential of the high-pressure jets without any modifications to the hull surface properties.

Results

The results of the simulations are provided in FIGS. 6-12. The results are provided in color format, due to the difficulty of displaying the same date in grayscale or black-and-white. For each of the cases (27 mph and 40 mph), three ways of visualizing the results are provided. The data forming the basis of FIGS. 6-12 is taken from points immediately adjacent the hull surface, as the air cavity is assumed to be very thin (measured in thousandths of inches range: 0.048-0.096 thousandths of an inch) and "sucked" or adhered to a position against the hull surface due to the low-pressure environment and fluid properties that cause a fluid to adhere to a non-permeable surface such as the hull. It is standard CFD practice to define air as any volume with a volume of water in air fraction of 0-0.5. The thickness above is based on this accepted standard definition.

Volume Fraction: In the Volume Fraction displays, the location of the jets and air cavity are clearly shown. The scale ranges from 0.00 (dark blue; entirely air) to 1.00 (dark red; entirely water), where 0.50 (green) represents a location where, volumetrically, air and water are present in equal volumes.

Velocity/Volume Fraction: These displays illustrate both the air cavity (i.e. the 0.00, blue areas below the surface) and also the velocity of the jetted fluid and Coanda flows. The scale ranges from 744.58 (red; velocity of the jetted fluid at the nozzle) down to 0.00 (blue).

Pressure: These displays illustrate the pressure in the particular location. The scale ranges from 8.00 psi (red) to −2.00 psi (blue).

Figure 6:
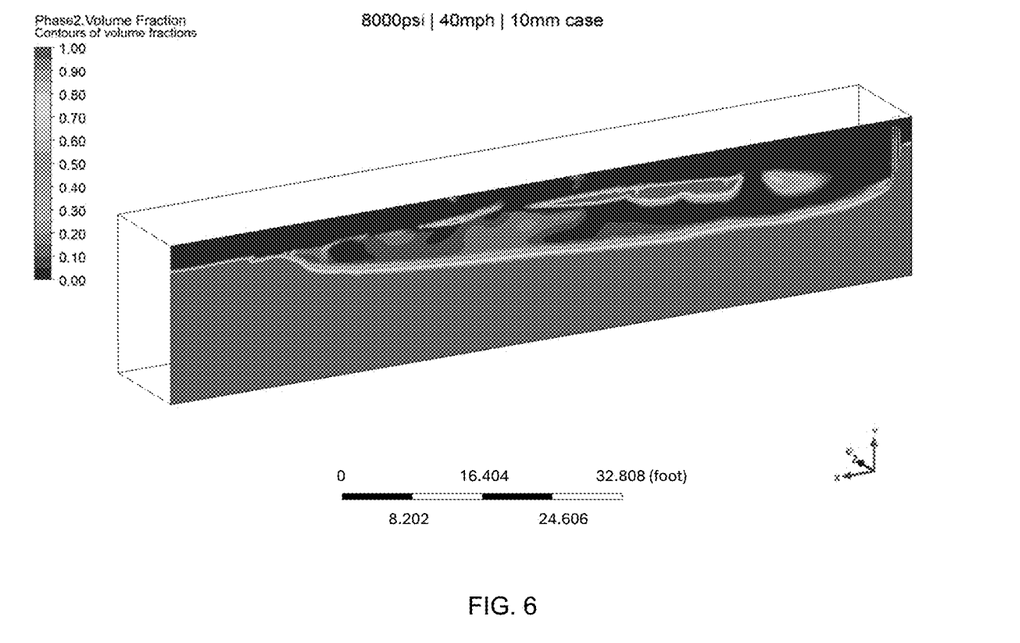
FIG. 6 illustrates the volume fraction CFD results, assuming 40 mph vessel speed, 8000 psi jetted fluid pressure, and 10 mm nozzle size.
Figure 9:
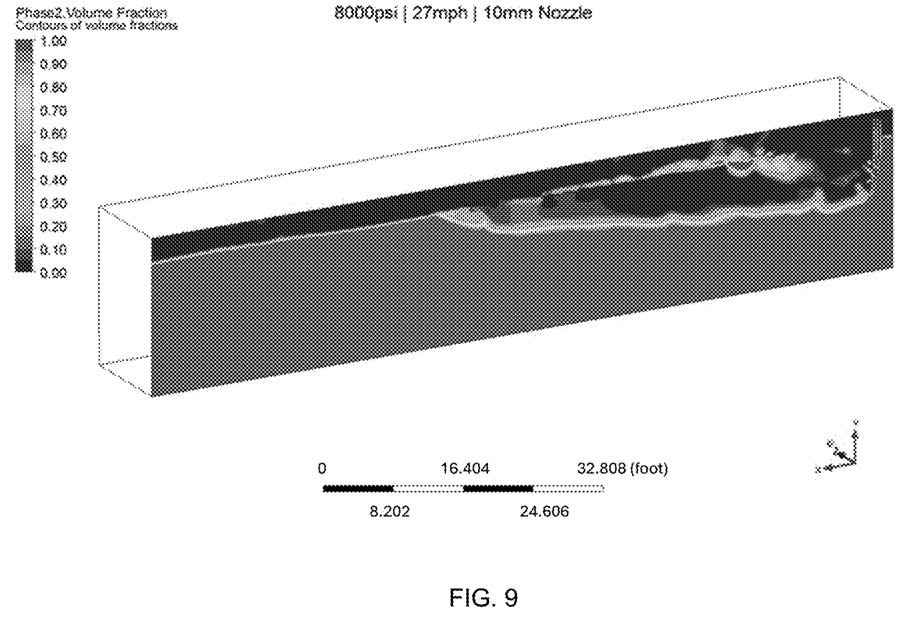
FIG. 9 illustrates the volume fraction CFD results, assuming 27 mph vessel speed, 8000 psi jetted fluid pressure, and 10 mm nozzle size.

Referring to FIGS. 6 and 9, the volume fraction results from the 40 mph and 27 mph cases are shown, respectively. In FIGS. 6 and 9, it can be seen how an area of dark blue/pure air extends from a position adjacent the three jet nozzles (right side of figure) and tapers moving in a direction toward the aft end of the vessel (left side of figure). This air cavity in FIGS. 6 and 9 has the approximate shape as was shown in FIG. 1. Notably, the air cavity is non-uniform and the volume fraction varies in several places, including some areas adjacent the surface of the water that appear to be mostly-if not entirely-water. The air cavity appears slightly less uniform in the 40 mph case of FIG. 6. Nonetheless, the CFD results illustrate a significant air cavity along the hull surface and aft of the jet nozzles.

Figure 7:
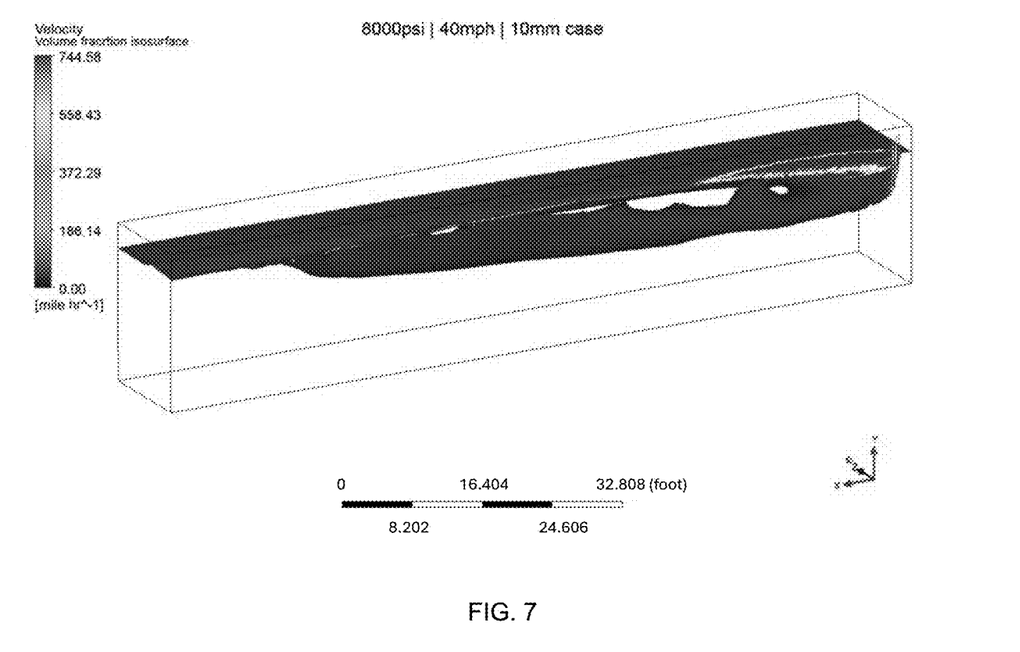
FIG. 7 illustrates the combined velocity and volume fraction CFD results, assuming 40 mph vessel speed, 8000 psi jetted fluid pressure, and 10 mm nozzle size.
Figure 7A:
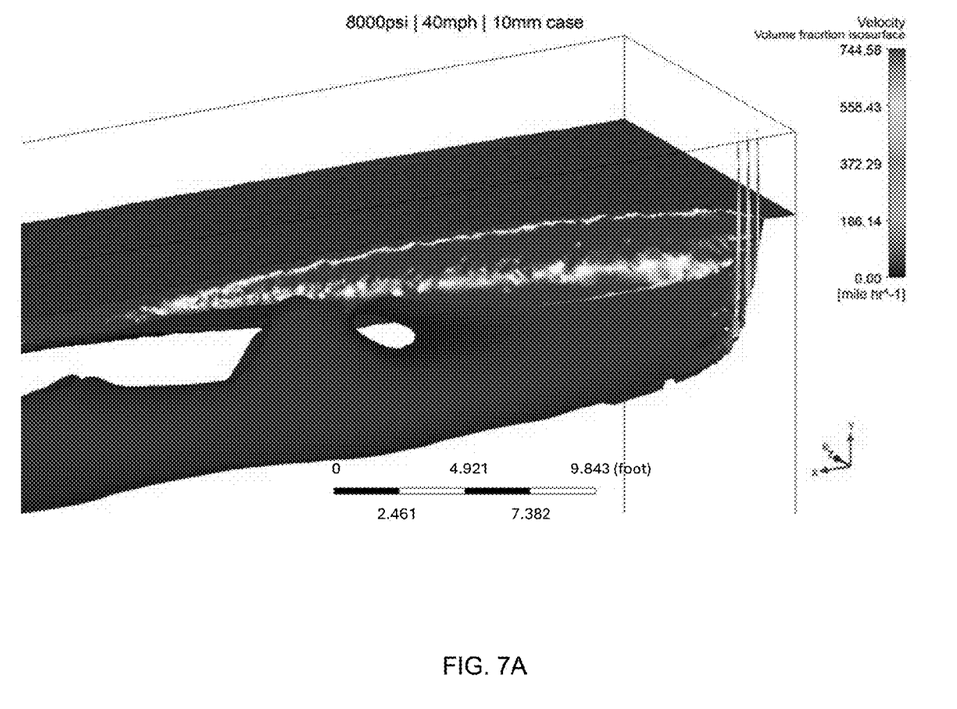
FIG. 7A is a close-up view of FIG. 7 in the area of the jetted fluid.
Figure 10:
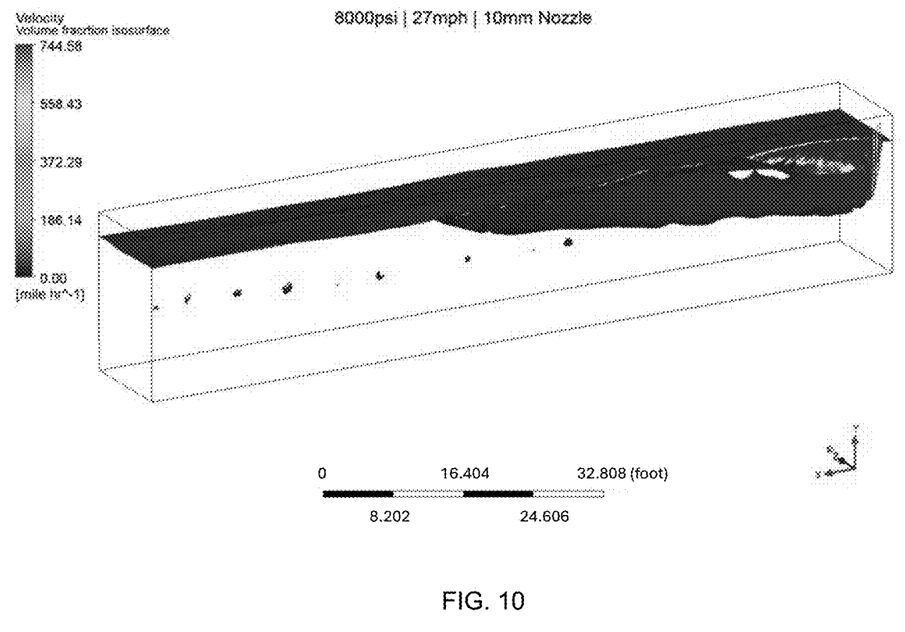
FIG. 10 illustrates the combined velocity and volume fraction CFD results, assuming 27 mph vessel speed, 8000 psi jetted fluid pressure, and 10 mm nozzle size.
Figure 10A:
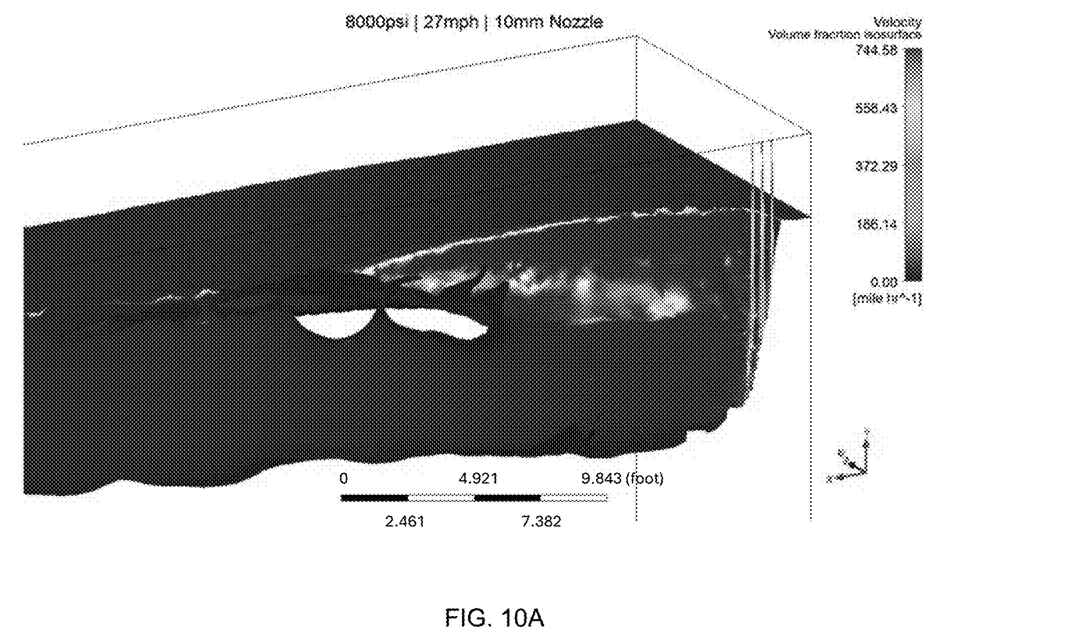
FIG. 10A is a close-up view of FIG. 10A in the area of the jetted fluid.

FIGS. 7 and 10 illustrate combined velocity and volume fraction results from the 40 mph and 27 mph cases, respectively. FIGS. 7A and 10A are close-up views of FIGS. 7 and 10, respectively, and are provided for ease of understanding. The three streams of jetted fluid are visible first as a dark red, indicating a velocity of approximately 744 mph. Just above the waterline, the streams are closer to a yellow, indicating a velocity of approximately 550 mph. These streams extend below the water surface, and maintain a significant velocity as they approach the depth of the bottom of the air cavity, which is illustrated in blue in FIGS. 7, 7A, 10 and 10A.

Surface anomalies due to the effect of the jetted fluid are also visible in FIGS. 7, 7A, 10 and 10A as a wave shape with a crest and a trough. It is assumed that this is due to the wave/wake created by the jetted fluid contacting the surface of the water through which the vessel is traveling.

Notably, the frontmost of the three streams of jetted fluid appears to degrade and is more affected by the oncoming fluid (water) associated with the speed of travel of the vessel and less degraded for the other streams aft of the frontmost stream.

Figure 8:
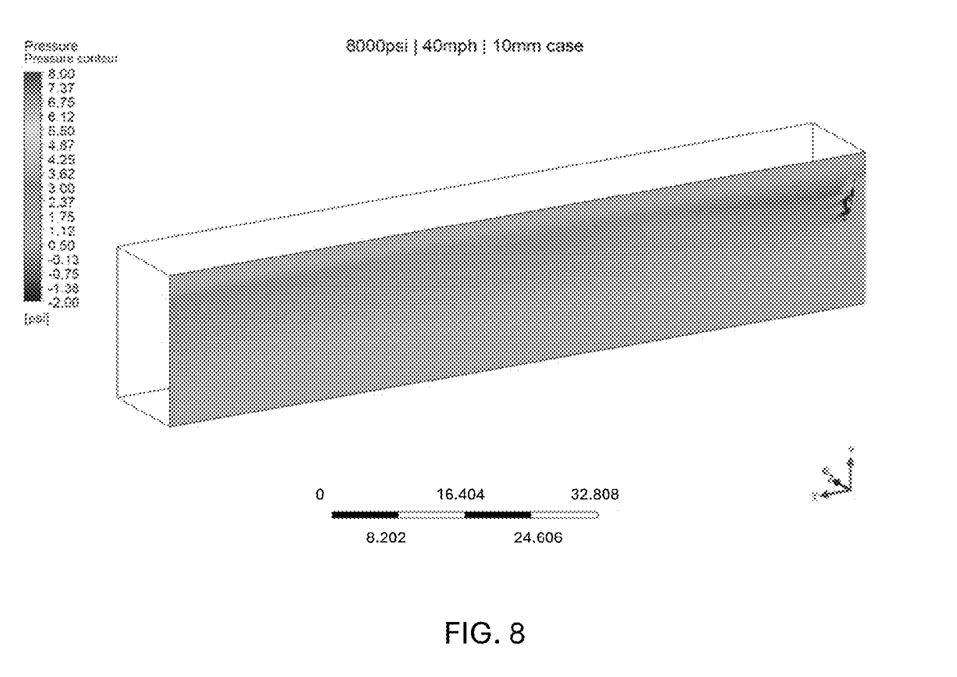
FIG. 8 illustrates the pressure contour CFD results, assuming 40 mph vessel speed, 8000 psi jetted fluid pressure, and 10 mm nozzle size.
Figure 8A:
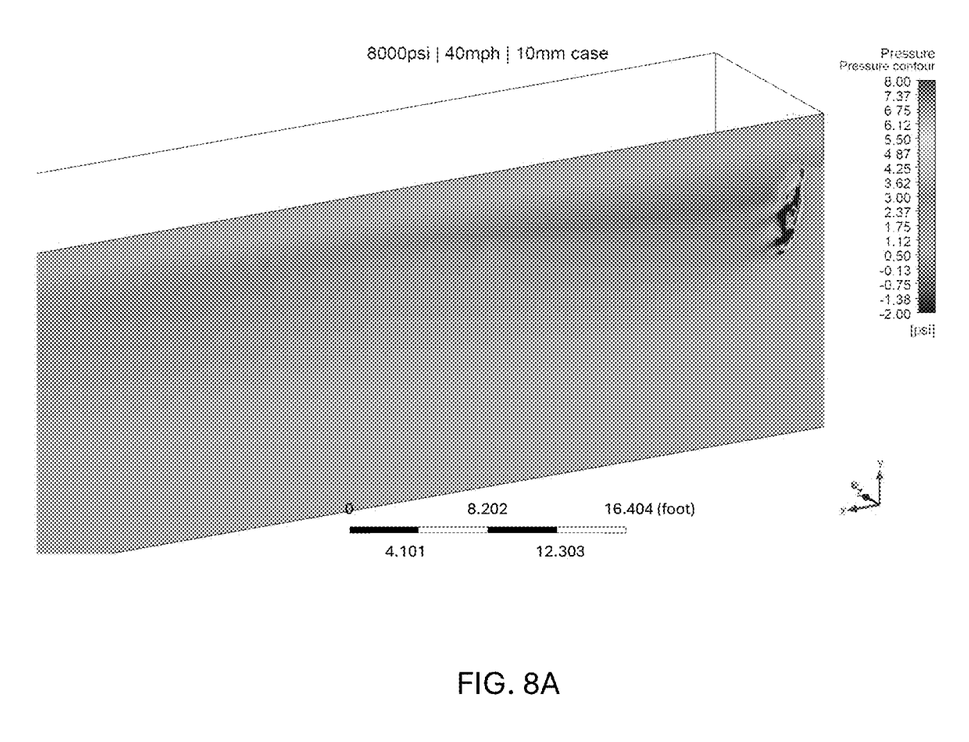
FIG. 8A is a close-up view of FIG. 8 in the area of the jetted fluid.
Figure 11:
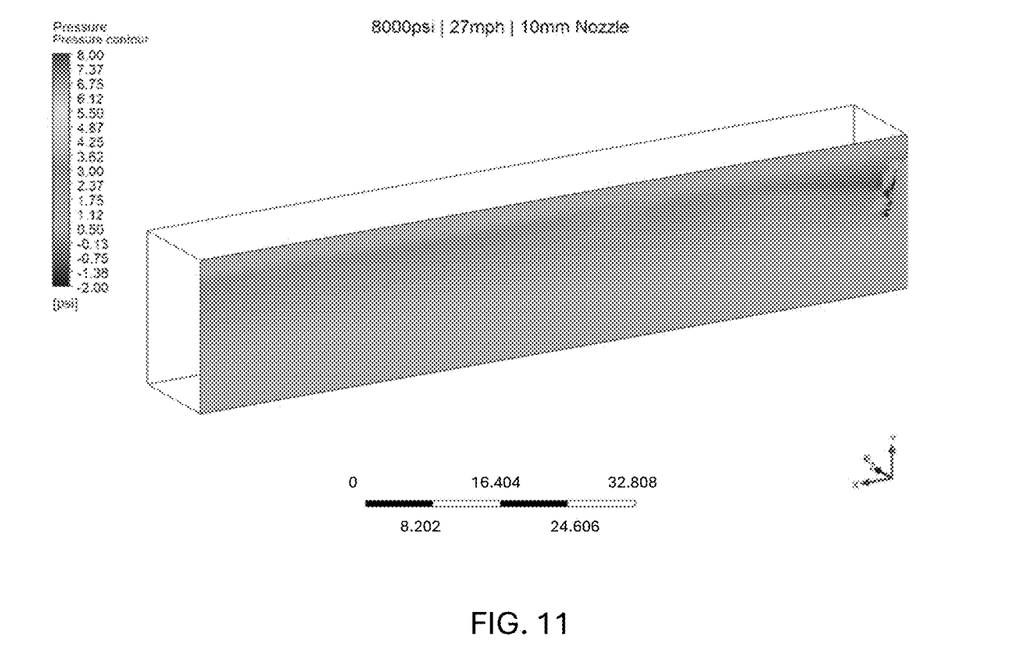
FIG. 11 illustrates the pressure contour CFD results, assuming 27 mph vessel speed, 8000 psi jetted fluid pressure, and 10 mm nozzle size.
Figure 11A:
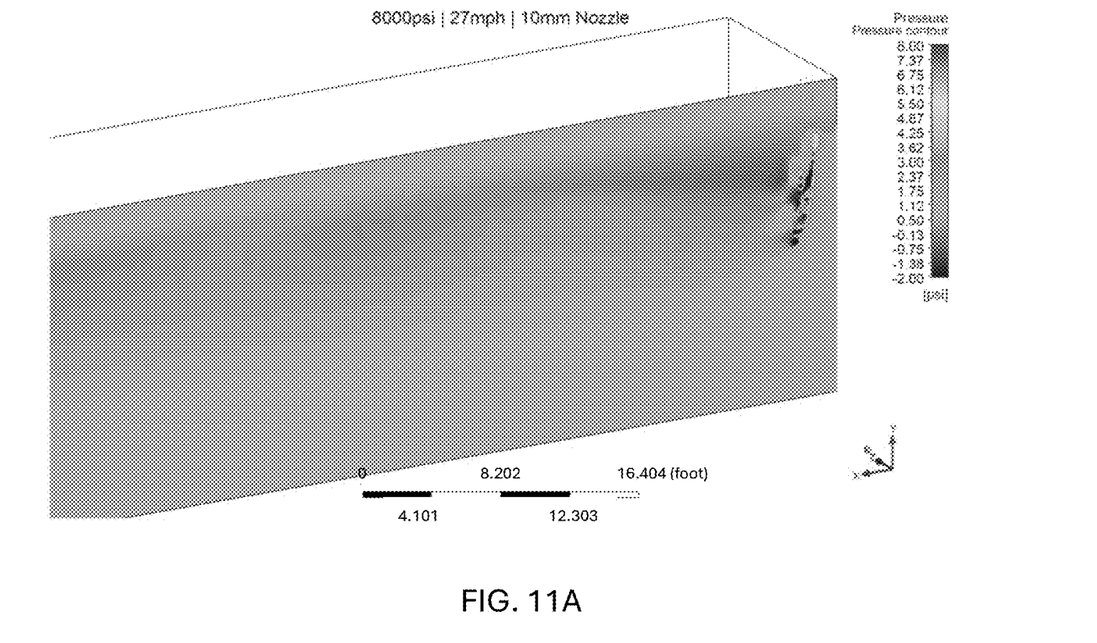
FIG. 11A is a close-up view of FIG. 11 in the area of the jetted fluid.

FIGS. 8 and 11 illustrate pressure contour results from the 40 mph and 27 mph cases, respectively. FIGS. 8A and 11A are close-up views of FIGS. 8 and 11, respectively, and are provided for ease of understanding. Importantly, areas of significantly-reduced pressure (appx. −2.00 psi) are shown immediately aft of the jetted streams in the area of Coanda flow. Further, coincident with the general area of the observed air cavity, areas of reduced pressure (appx. 0.0 psi to −1.0 psi) are observed. The affected area appears to extend significantly beyond the air cavity, with sub 1.0 psi trailing the area of the observed air cavity.

Figure 12:
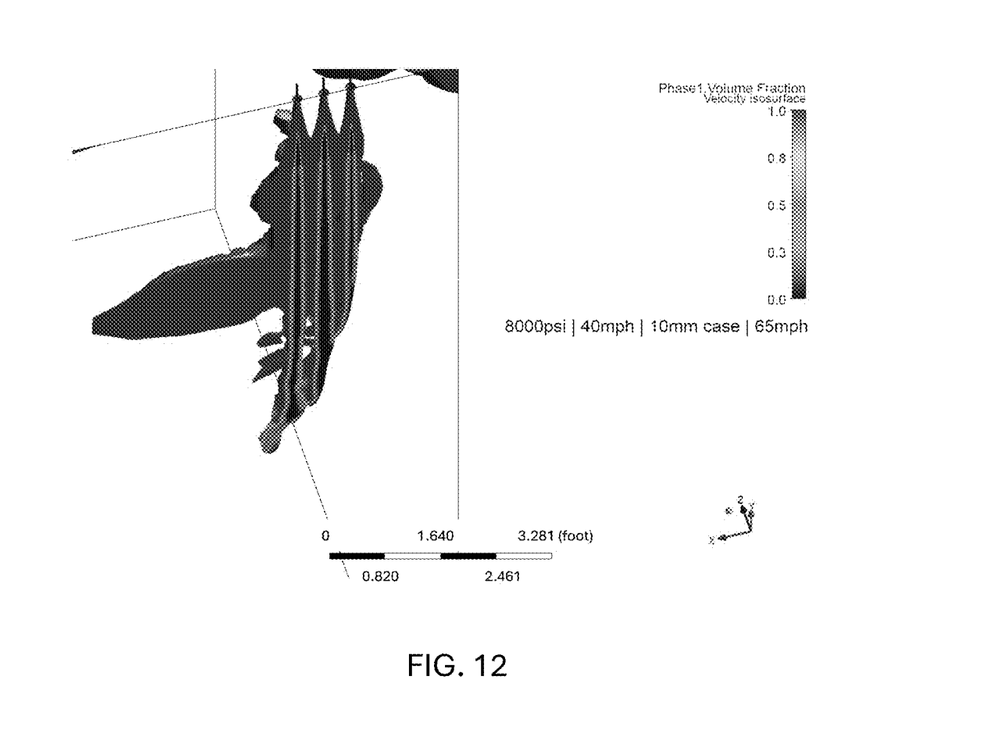
FIG. 12 are CFD results illustrating the formation of the air cavity, assuming 40 mph vessel speed, 8000 psi jetted fluid pressure, and 10 mm nozzle size.

FIG. 12 illustrates the formation of the air cavity, assuming 40 mph vessel speed, 8000 psi jetted fluid pressure, and 10 mm nozzle size. In particular, this velocity isosurface/volume fraction displays the entrainment of the air (dark red) in the vicinity of the Coanda flows (primarily blue). It should be noted that Coanda flows at or above 65 mph are shown in FIG. 12, whereas the cutoff for illustration of Coanda flows in other figures is 150 mph.

CFD simulations with a 5 mm nozzle size parameter were similarly effective at creating the air cavity. However, further research is required to understand the individual or combined effect of the input variables. It is noted that utilizing a 5 mm diameter nozzle orifice, the results of creating an air cavity have been replicated using less than ¼ of the volumetric flow rate at the same pressure.

The tables below provide full details for the CFD setup used for the simulations discussed herein.

TABLE 1

| Operating Conditions | |
|---|---|
| Property | Value |
| Atmospheric pressure | 14.696 psi |
| Temperature | 20 C. |
| Saltwater temperature | 20 C. |

TABLE 2A

| Material Properties - Water | |
|---|---|
| Property | Value |
| Density | 998.2 kg/m^3 |
| Cp (Specific Heat) | 4182 J/(kg K) |
| Thermal Conductivity | 0.6 W/(m K) |
| Viscosity | 0.001003 kg/(m s) |
| Molecular Weight | 18.0152 kg/kmol |

TABLE 2B

Material Properties - Air

| Property | Value |
| --- | --- |
| Density | 1.225 kg/m^3 |
| Cp (Specific Heat) | 1006.43 J/(kg K) |
| Thermal Conductivity | 0.0242 W/(m K) |
| Viscosity | 1.7894e−05 kg/(m s) |
| Molecular Weight | 28.966 kg/kmol |

TABLE 3

Boundary Conditions

| Boundary | Type | Condition |
| --- | --- | --- |
| Jet nozzle | Velocity inlet | Velocity: 740 mph<br>Turbulent intensity: 5% |
| Flow inlet | Pressure inlet channel flow | Velocity: 27, 40 mph |
| Flow outlet | Pressure outlet channel flow | Free surface level: 5 m |
| Plate | Wall | Non-slip |

TABLE 4

Solver Setting

| Solver Setting | Details |
| --- | --- |
| Flow Solver | Pressure-based, double-precision |
| Turbulence Model | SST k-omega turbulence model |
| Multiphase Model | Volume of Fluid (VOF) method |
| Pressure-Velocity Coupling | Coupled scheme with volume fractions |
| Gradient | Least Squares Cell Based |
| Pressure Discretization | PRESTO! (Pressure Staggering Option) |
| Momentum Discretization | Second Order Upwind |
| Volume Fraction Discretization | Modified HRIC (High Resolution Interface Capturing) |
| Turbulent Kinetic Energy | Second Order Upwind |
| Turbulent Dissipation Rate | Second Order Upwind |
| Surface Tension | Enabled (0.073 N/m) |

Notwithstanding the criticality of forcing the Coanda flow above the waterline as discussed with respect to the embodiments discussed above, within the concept of the present invention it may be possible to force the Coanda flow beginning sub-waterline in certain configurations. Specifically, it would be possible to provide pseudo-surface conditions in the form of a habitat (as used in diving applications) below the waterline and providing the jetting of fluid in the area of the habitat. In this case, air or other gas may be fed to the habitat or vicinity of the habitat to supply the desired air cavity.

Other potential configurations of the present invention are contemplated, including systems where "nested" or "starter" Coanda flows are first forced so as to aerate the desired area along the hull. The primary Coanda flow would then be forced, and because of the aeration provided by the starter Coanda flow, the primary Coanda flow encounters less resistance, and is capable of flowing at greater velocities further down or along the hull of the vessel. The jet(s) providing the starter Coanda flow can then be turned off.

In other configurations, as mentioned herein above, the jets may be provided on the stern of the vessel and face in the direction of the bow. In particular, such a configuration may be advantageous in the higher-speed vessels, particularly those with V-shaped hulls (such as speedboats). The V-shaped hull has as a wetted surface at a particular speed. The wetted surface is a V-shape when viewed from below, with the point of the V being in the bow direction of the vessel. By providing stern-mounted jets immediately within the wetted surface, and directed from the stern toward the bow (i.e. the point of the V), it is believed that an air cavity could be created/entrained along the hull in the area between Coanda flows forced by the jets. This would result in a great reduction of friction between the wetted surface and the water in which the vessel is traveling.

In other configurations, mechanisms or structures may be provided to deflect Coanda flows away from the vessel. For example, in the V-shaped hull example above, a structure could be provided at the centerline of the bow of the vessel to direct the Coanda flows (which originated at the stern) away from the front of the vessel so as to avoid any interference in the forward travel of the vessel. Similar structures could be provided at the keel/base of the vessel to deflect Coanda flows—which had traveled downward along the entire vertical distance of the hull—away from the vessel. In other words, once the beneficial aspects of the Coanda flow have been achieved, they are deflected away from the vessel.

The invention claimed is:

1. A method of reducing drag on a hull of a vessel comprising:
providing at least one jet nozzle positioned above a waterline of the vessel, said at least one jet nozzle adapted to jet a fluid; and
creating a Coanda flow on the hull of the vessel by jetting the fluid onto the hull or a surface continuous with the hull at a location above the waterline of the vessel, wherein the Coanda flow extends below the waterline of the vessel, and wherein the fluid is water.

2. The method of claim 1, wherein the jetted fluid contacts the hull or the surface continuous with the hull at an angle between 0.001 and 90 degrees.

3. The method of claim 2, wherein the angle is approximately 2.5 degrees.

4. The method of claim 1, wherein air is entrained as the Coanda flow extends below the waterline of the vessel, so as to create an air cavity between the hull and surrounding water in which the vessel is moving.

5. The method of claim 1, wherein the surface continuous with the hull is a wear plate, the wear plate having a target thereon.

6. The method of claim 1, the at least one jet nozzle comprising two or more nozzles arranged in spaced relation along the vessel such that respective Coanda flows of the two or more nozzles merge.

7. A method of creating an air cavity between the hull of a vessel and surrounding water in which the vessel is traveling, the method comprising:
providing at least one jet nozzle positioned above a waterline of the vessel, said at least one jet nozzle adapted to jet a fluid; and
jetting the fluid against the hull or a surface continuous with the hull such that the jetted fluid forms a Coanda flow which extends from a point above a waterline of the vessel to a point below the waterline of the vessel, wherein the fluid is water.

8. The method of claim 7, the at least one jet nozzle comprising two or more nozzles arranged in spaced relation along the vessel such that respective Coanda flows of the two or more nozzles merge.

9. A system for reducing drag on the hull of a vessel, the system comprising:
a pump in fluid communication with a source of water;
a power source connected to the pump; and at least one nozzle in fluid communication with the pump, said at least one nozzle positioned above a waterline of the vessel, the at least one nozzle oriented towards a hull of the vessel, wherein the at least one nozzle is adapted to jet water so as to contact the hull of the vessel or a surface continuous with the hull of the vessel with an angle of incidence of between 0.001 and 90 degrees, such that a Coanda flow is formed on the hull of the vessel.

10. The system of claim 9, further comprising:
a wear plate affixed to or formed integrally with the hull of the vessel, the at least one nozzle being directed towards a target on the wear plate.

11. The system of claim 10, wherein the target of the wear plate is positioned above the waterline of the vessel.

12. The system of claim 9, said at least one nozzle comprising:
at least one nozzle positioned on a starboard side of the vessel; and
at least one nozzle positioned on a port side of the vessel.

13. The system of claim 12, wherein two or more nozzles are positioned on each of the port and starboard sides of the vessel.

14. The system of claim 9, wherein the at least one nozzle comprises:
a first grouping of nozzles; and
a second grouping of nozzles positioned apart from the first grouping of nozzles on the same side of the vessel.

15. The system of claim 9, said at least one nozzle comprising;
at least one nozzle positioned at or near a bow or stern of the vessel.

\* \* \* \* \*